United States Patent
Anderson et al.

(10) Patent No.: US 9,017,803 B2
(45) Date of Patent: Apr. 28, 2015

(54) SUBSTRATE FOR WALLBOARD JOINT TAPE AND PROCESS FOR MAKING SAME

(75) Inventors: Dennis W. Anderson, Goshen, OH (US); James E. Sealey, Anderson, SC (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 13/552,959

(22) Filed: Jul. 19, 2012

(65) Prior Publication Data

US 2013/0087268 A1  Apr. 11, 2013

Related U.S. Application Data (60) Provisional application No. 61/509,775, filed on Jul. 20, 2011.

(51) Int. Cl.
| | |
|---|---|
| E04F 13/04 | (2006.01) |
| D21H 27/32 | (2006.01) |
| B32B 7/02 | (2006.01) |
| B32B 29/00 | (2006.01) |
| D21H 27/20 | (2006.01) |

(52) U.S. Cl.
CPC ............ *E04F 13/042* (2013.01); *D21H 27/20* (2013.01); *D21H 27/32* (2013.01); *B32B 7/02* (2013.01); *B32B 29/005* (2013.01)

(58) Field of Classification Search
CPC .................................................. E04F 13/042
USPC ............................................ 428/212; 52/417
See application file for complete search history.

(56) References Cited

U.S. PATENT DOCUMENTS

| | | | |
|---|---|---|---|
| 2,624,079 A | 1/1953 | Duvall | |
| 2,667,822 A | 2/1954 | Christman | |
| 2,698,271 A | 12/1954 | Clark | |
| 3,194,469 A | 7/1965 | Rumberger | |
| 3,825,381 A | 7/1974 | Dunning et al. | |
| 3,895,089 A | 7/1975 | Goyal | |
| 4,022,965 A | 5/1977 | Goheen et al. | |
| 4,041,202 A * | 8/1977 | Williams | 428/138 |
| 4,075,136 A | 2/1978 | Schaper | |
| 4,141,772 A | 2/1979 | Ruell | |
| 4,166,894 A | 9/1979 | Schaper | |
| 4,174,417 A | 11/1979 | Rydell | |
| 4,351,877 A | 9/1982 | Williams | |
| 4,370,289 A | 1/1983 | Sorenson | |

(Continued)

FOREIGN PATENT DOCUMENTS

| | | |
|---|---|---|
| DE | 19800797 | 7/1999 |
| EP | 0390409 | 10/1990 |

(Continued)

*Primary Examiner* — Aaron Austin
*Assistant Examiner* — Laura Figg
(74) *Attorney, Agent, or Firm* — Thomas W. Barnes, III (57) ABSTRACT

A multi-ply paper substrate is provided, which comprises at least two plies bonded to one another by an adhesive; a basis weight of 80-200 gsm; an internal bond of 10-180 milli-ft.-lb/sq. in. as measured by TAPPI method 541; an MD tensile of 20-300 lb/inch width as measured by TAPPI method 494; and a CD tensile of 10-300 lb/inch width as measured by TAPPI method 494. Methods of making and using the paper substrate, products made therefrom, and uses of the paper substrate are also provided.

38 Claims, 5 Drawing Sheets

(56) References Cited

U.S. PATENT DOCUMENTS

| | | | |
|---|---|---|---|
| 4,431,481 | A | 2/1984 | Drach et al. |
| 4,496,427 | A | 1/1985 | Davison |
| 4,986,882 | A | 1/1991 | Mackey et al. |
| 5,049,235 | A | 9/1991 | Barcus et al. |
| 5,160,789 | A | 11/1992 | Barcus et al. |
| 5,190,798 | A | 3/1993 | Bloch |
| 5,209,953 | A | 5/1993 | Grupe et al. |
| 5,266,250 | A | 11/1993 | Kroyer |
| 5,360,420 | A | 11/1994 | Cook et al. |
| 5,443,899 | A | 8/1995 | Barcus et al. |
| 5,531,728 | A | 7/1996 | Lash |
| 5,662,773 | A | 9/1997 | Frederick et al. |
| 5,667,637 | A | 9/1997 | Jewell et al. |
| 5,698,074 | A | 12/1997 | Barcus et al. |
| 5,698,688 | A | 12/1997 | Smith et al. |
| H1704 | H | 1/1998 | Wallajapet et al. |
| 6,146,494 | A | 11/2000 | Seger et al. |
| 6,361,651 | B1 | 3/2002 | Sun |
| 6,471,824 | B1 | 10/2002 | Jewell |
| 6,506,282 | B2 | 1/2003 | Hu et al. |
| 6,579,414 | B2 | 6/2003 | Jewell |
| 6,579,415 | B2 | 6/2003 | Jewell |
| 6,582,557 | B2 | 6/2003 | Jewell |
| 6,592,717 | B2 | 7/2003 | Jewell |
| 7,789,996 | B2 | 9/2010 | Buzza et al. |
| 2006/0191656 | A1* | 8/2006 | Buzza et al. ............ 162/158 |
| 2006/0207738 | A1 | 9/2006 | Wild |
| 2006/0254170 | A1 | 11/2006 | Goldman |
| 2008/0139064 | A1 | 6/2008 | Neill et al. |
| 2008/0256886 | A1 | 10/2008 | Goldman |
| 2010/0092725 | A1 | 4/2010 | Goldman |
| 2010/0136268 | A1 | 6/2010 | Rasch |
| 2010/0215900 | A1* | 8/2010 | Conboy ................ 428/137 |

FOREIGN PATENT DOCUMENTS

| | | |
|---|---|---|
| EP | 0480724 | 4/1992 |
| EP | 1586447 | 10/2005 |
| WO | 2006014426 | 2/2006 |
| WO | 2010148156 | 12/2010 |

* cited by examiner

FIG. 1
Conventional Single-Ply Substrate for Joint Tape (Before Sanding)

FIG. 2
3-Ply Substrate for Joint Tape (Before Sanding)

FIG. 3
Example of 5-ply Construction

FIG. 4
Example of 4-ply Construction

FIG. 5

Example of 2-ply Construction
(Plies shown separated for clarity)

Adhesive for bonding two
adjoining plies together,
e.g. starch 0.05 gsm to 5.0 gsm Two plies long-fiber,
moderately refined
for strength FIG. 6
Air Laid Machine - 4 Layer FIG. 7
Head Box Detail

SUBSTRATE FOR WALLBOARD JOINT TAPE AND PROCESS FOR MAKING SAME

BACKGROUND

Field of the Invention

The invention relates to a substrate for wallboard joint tape, products made thereby, and processes for making and using.

BRIEF DESCRIPTION OF THE FIGURES

Various embodiments are described in conjunction with the accompanying figures, which are not intended to be limiting unless otherwise specified.

FIG. 3 shows a cross-sectional view of another example of a multi-ply paper substrate. In the embodiment shown, the drawing elements 1-5 may be described as follows: (1) low-bonded, long-fiber component suitable for nap generation; (2) highly-bonded, high-strength for tensile requirements; (3) low-bonded, short-fiber component for delamination requirements; (4) highly-bonded, high-strength for tensile requirements; and (5) low-bonded, long-fiber component suitable for nap generation. Plies 2 and 4, the strength plies, may also contain strength and sizing additives, highly refined cellulose fiber, and synthetic fibers.

FIG. 4 shows a cross-sectional view of one example of a multi-ply paper substrate. In the embodiment shown, the drawing elements 1-4 may be described as follows: (1) low-bonded, long-fiber component suitable for nap generation; (2) low-bonded, short-fiber component for delamination requirements; (3) highly-bonded, high-strength for tensile requirements; (4) low-bonded, long-fiber component suitable for nap generation. Ply 3, the strength ply, may also contain strength and sizing additives, highly refined cellulose fiber, and synthetic fibers.

DETAILED DESCRIPTION OF THE SEVERAL EMBODIMENTS

One embodiment of the subject matter claimed herein provides a product suitable for next-generation wallboard joint tape and process for making same. One advantage of the subject matter claimed herein is that the internal strength (e.g., in the z-direction) of the wallboard joint tape is decoupled from in-plane strength (e.g., the machine direction (MD) and cross-machine (CD) directions). Another advantage of the subject matter claimed herein is that the product has a low yet controllable internal strength and a high in-plane tensile strength. Another advantage of the subject matter claimed herein is that the surface sides may be customized such that a robust nap can be generated with little or no sanding thereby conserving energy, increasing sandpaper life, and creating a bondable surface which has not previously been possible. Another advantage is the achievement of a multi-ply paper substrate and wallboard joint tape having distinct and optimized layers, which have heretofore eluded makers of wallboard joint tape and/or multi-ply paper substrates.

One embodiment of the subject matter claimed herein provides a multi-ply paper substrate, comprising:
  at least two plies bonded to one another by an adhesive;
  a basis weight of 80-200 gsm (grams per square meter);
  an internal bond of 10-180 milli-ft.-lb/sq. in. as measured by TAPPI method 541;
  an MD tensile of 20-300 lb/inch width as measured by TAPPI method 494; and
  a CD tensile of 10-300 lb/inch width as measured by TAPPI method 494.

As used herein, the term, "ply" or "plies" refers to a layer or more than one layer in the substrate. The layer may be bounded on one side or both sides by adhesive, binder, or other layers. A given layer may have the same or substantially the same composition throughout its thickness (i.e., the distance between one side and the opposing side), or it may have a composition gradient that varies along the thickness.

As used herein, the term, "side" or "sides" refers to the broad surface(s) or interface(s) of any of the substrate, ply, adhesive (e.g., "adhesive region") or wallboard joint tape and is distinguished from the "edge" or "edges" thereof. For example, when the wallboard joint tape is applied over a wallboard joint, one side of the tape, i.e., the "wall side" is contacted with the wallboard; and the other side of the tape, i.e., the "work side" may remain exposed until contacted with wallboard joint compound, sometimes referred to as drywall "mud". In the event that a repair to the thus-taped wallboard or tape is necessary, the tape may be peeled apart by the installer, i.e., the tape delaminates to form two new sides, one of which—the newly-exposed surface of that part of the tape remaining on the wall—may be a new work side. That part of the tape which is peeled off may be discarded or reused as appropriate.

The multi-ply paper substrate comprises at least two plies bonded to one another by an adhesive. In a cross-sectional view of the multi-ply paper substrate, the adhesive may appear, for example, by staining and microscopic examination, as a distinct region, distinguishable from the two adjoining plies in composition or other property; or it may be indistinguishable in cross section from the adjoining plies, for example in the case wherein the adhesive not only bonds the two adjoining plies to one another but also permeates each ply and, acting as a binder, provides internal bonding for all of or a portion of one or both plies. In one embodiment, the respective plies may have the same or different composition, thickness, and/or properties. In one embodiment, the plies are produced in an air-laid papermaking process. In one embodiment, two adjoining plies interpenetrate one another in the adhesive bonding region. In another embodiment, two adjoining plies partly interpenetrate one another in the adhesive bonding region. In another embodiment, two adjoining plies do not interpenetrate at all, being separated from one another by the intervening adhesive bonding region. In one embodiment, the adhesive region is not considered as a distinct ply.

The multi-ply paper substrate has a basis weight of 80-200 gsm. This range includes all values and subranges therebetween, including 80, 90, 100, 110, 120, 130, 140, 150, 160, 170, 180, 190, and 200 gsm. In one embodiment, the basis weight of one ply or more than one ply may be less than 80 gsm so long as the multi-ply paper substrate has a basis weight of 80-200 gsm. Basis weight and its measurement are known to those of ordinary skill in the papermaking art.

The multi-ply paper substrate has an internal bond (CD or MD) of 10-180 milli-ft.-lb/sq. in. as measured by TAPPI method 541. This range includes all values and subranges therebetween, including 10, 20, 30, 40, 50, 60, 70, 80, 90, 100, 110, 120, 130, 140, 150, 160, 170, and 180 milli-ft.-lb/sq. in. The measurement is carried out in accordance with the known TAPPI method 541, incorporated herein by reference. In one embodiment, one ply or more than one ply in the multi-ply paper substrate may have an internal bond of 10-180 milli-ft.-lb/sq. in. In another embodiment, the adhesive that bonds two plies together may give rise to an internal bond of 10-180 milli-ft.-lb/sq. in. for the multi-ply paper substrate. In another embodiment, a combination of one or more plies and adhesive may give rise to an internal bond of 10-180 milli-ft.-lb/sq. in. for the multi-ply paper substrate. In one embodiment, the internal bond of one ply or more than one ply, the adhesive that bonds two plies together, or a combination thereof may be greater than 180 milli-ft.-lb/sq. in so long as the multi-ply paper substrate has an internal bond of 10-180 milli-ft.-lb/sq. in.

The multi-ply paper substrate has an MD tensile of 20-300 lb/inch width as measured by TAPPI method 494. This range includes all values and subranges therebetween, including 20, 30, 40, 50, 60, 70, 80, 90, 100, 110, 120, 130, 140, 150, 160, 170, 180, 190, 200, 210, 220, 230, 240, 250, 260, 270, 280, 290, and 300 lb/inch width. The measurement is carried out in accordance with the known TAPPI method 494, incorporated herein by reference. In one embodiment, one ply or more than one ply in the multi-ply paper substrate may have an MD tensile of 20-300 lb/inch width. In one embodiment, the MD tensile of one ply or more than one ply may be 0-300 lb/inch width so long as the multi-ply paper substrate has an MD tensile of 20-300 lb/inch width.

The multi-ply paper substrate has a CD tensile of 10-300 lb/inch width as measured by TAPPI method 494. This range includes all values and subranges therebetween, including 10, 20, 30, 40, 50, 60, 70, 80, 90, 100, 110, 120, 130, 140, 150, 160, 170, 180, 190, 200, 210, 220, 230, 240, 250, 260, 270, 280, 290, and 300 lb/inch width. The measurement is carried out in accordance with the known TAPPI method 494, incorporated herein by reference. In one embodiment, one ply or more than one ply in the multi-ply paper substrate may have a CD tensile of 10-300 lb/inch width. In one embodiment, the CD tensile of one ply or more than one ply may be 0-300 lb/inch width so long as the multi-ply paper substrate has a CD tensile of 10-300 lb/inch width.

In one embodiment, one or more plies of the multi-ply paper substrate have:

an MD tensile of 20-300 lb/inch width as measured by TAPPI method 494; and a CD tensile of 10-300 lb/inch width as measured by TAPPI method 494.

In one embodiment, CD and MD tensiles of the multi-ply paper substrate are equal to one another. In one embodiment, the CD and MD tensiles of a ply are equal to one another. When the MD tensile and CD tensile are equal to one another, the range is not particularly limited. In one embodiment, the MD and CD tensiles are equal and may range from 20-300 lb/inch width. This range includes all values and subranges therebetween, including 20, 30, 40, 50, 60, 70, 80, 90, 100, 110, 120, 130, 140, 150, 160, 170, 180, 190, 200, 210, 220, 230, 240, 250, 260, 270, 280, 290, and 300 lb/inch width, as measured by TAPPI method 494.

Though not particularly limited, in one embodiment, a single ply may have an internal bond of 10-180 milli-ft.-lb/sq. in. as measured by TAPPI method 541. This range includes all values and subranges therebetween, including 10, 20, 30, 40, 50, 60, 70, 80, 90, 100, 110, 120, 130, 140, 150, 160, 170, and 180 milli-ft.-lb/sq. in.

Though not particularly limited, in one embodiment, the adhesive bonding two adjoining plies together may be in the form of an adhesive layer or adhesive region between the two plies, at the interface of the two plies, interpenetrating into one or both of the two plies, or a combination thereof. In another embodiment, the adhesive may have an internal bond of 10-180 milli-ft.-lb/sq. in. as measured by TAPPI method 541. This range includes all values and subranges therebetween, including 10, 20, 30, 40, 50, 60, 70, 80, 90, 100, 110, 120, 130, 140, 150, 160, 170, and 180 milli-ft.-lb/sq. in.

So long as it bonds two or more plies together, the adhesive is not particularly limited. It may include starch, cooked starch, adhesive starch, fiber, bicomponent fiber, cellulose fiber, synthetic fiber, binder, or any combination thereof.

Though not particularly limited, the adhesive may be present in one or more of the adhesive regions in an amount of 0.05-10 gsm. This range includes all values and subranges therebetween, including 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, and 10 gsm.

In one embodiment, wherein the adhesive includes bicomponent fiber and the ply or plies include cellulose fiber, the amount of adhesive for inter-ply bonding may range from 0.5-10 gsm of adhesive, which range includes all values and subranges therebetween, including 0.5, 0.6, 0.7, 0.8, 0.9, 1, 2, 3, 4, 5, 6, 7, 8, 9, and 10 gsm. In another embodiment, wherein the adhesive includes bicomponent fiber and the ply or plies include cellulose fiber, the amount of adhesive for intra-ply bonding may range from 2-100% by weight of the finished ply, which range includes all values and subranges therebetween, including 2, 3, 4, 5, 6, 7, 8, 9, 10, 15, 20, 25, 30, 35, 40, 45, 50, 60, 70, 80, 90, 95, 99, and 100% by weight of the finished ply.

In another embodiment, the adhesive, one or more adjoining plies, or both the adhesive and one or more adjoining plies may have an internal bond or bonds of 10-180 milli-ft.-lb/sq. in. as measured by TAPPI method 541. This range includes all values and subranges therebetween, including 10, 20, 30, 40, 50, 60, 70, 80, 90, 100, 110, 120, 130, 140, 150, 160, 170, and 180 milli-ft.-lb/sq. in.

Though not particularly limited, in one embodiment, a single ply may have an internal bond of 10-180 milli-ft.-lb/sq. in. as measured by TAPPI method 541. This range includes all values and subranges therebetween, including 10, 20, 30, 40, 50, 60, 70, 80, 90, 100, 110, 120, 130, 140, 150, 160, 170, and 180 milli-ft.-lb/sq. in.

Though not particularly limited, in one embodiment, one or more plies may have an internal bond or bonds of greater than 180 milli-ft.-lb/sq. in. as measured by TAPPI method 541. In another embodiment, all but one ply in a multi-ply paper substrate may have internal bonds of greater than 180 milli-ft.-lb/sq. in. as measured by TAPPI method 541. These ranges include all values and subranges therebetween, for example greater than 180, 181, 183, 185, 187, 189, 190, 200, 210, 220, 250 milli-ft.-lb/sq. in, and higher, as measured by TAPPI method 541.

Though not particularly limited, in one embodiment, the adhesive that bonds two plies to one another may have an internal bond of greater than 180 milli-ft.-lb/sq. in. as measured by TAPPI method 541. In another embodiment, one, more than one, or all the adhesive that bonds the respective plies together may have an internal bond or bonds greater than 180 milli-ft.-lb/sq. in. as measured by TAPPI method 541. These ranges include all values and subranges therebetween, for example greater than 180, 181, 183, 185, 187, 189, 190, 200, 210, 220, 250 milli-ft.-lb/sq. in, and higher, as measured by TAPPI method 541.

Though not particularly limited, in one embodiment, the adhesive, a single ply, or both may have an internal bond or bonds of greater than 180 milli-ft.-lb/sq. in. as measured by TAPPI method 541.

Though not particularly limited, in one embodiment, one or more sides of the paper substrate may have a Taber abrasion of 50-200 mg as measured by a modified Tappi method 476 om-06. This range includes all values and subranges therebetween, including 50, 60, 70, 80, 90, 100, 110, 120, 130, 140, 150, 160, 170, 180, 190, and 200 mg. The Tappi method is modified as follows: 1.0 kg deadweight on each arm; CS-10P abrasion wheels from Taber Industries; 100 revolutions; "mg" is mg weight loss per 100 revolutions. Taber abrasion and methods of achieving it and measuring it on paper substrate surfaces are known. For example, in one embodiment, one or both sides of the paper substrate may be sanded or abraded according to known methods to quantify the desired Taber abrasion. In another embodiment, the paper substrate may include a ply, or an adhesive that bonds two plies together, or a combination thereof that, upon delamination, yields a newly exposed side having the desired Taber abrasion.

In one embodiment, in considering a surface conducive to nap generation and correspondingly good layup bond (good adhesion of the paper substrate's surface to the binder in the joint compound), long fibers, as opposed to short fibers, may be used in one or both of the outer plies. Long fibers provide more surface area for contact with the binder in the drywall mud or joint compound. In one embodiment, the fibers are not over-refined, as elevated refining levels result in more fiber-to-fiber bonding. More bonding may be associated with greater difficulty in generating nap (i.e. a stronger surface region). In one embodiment, wet pressing may be minimized or eliminated altogether, which consolidates the wet surface and leads to greater levels of hydrogen bonding (i.e. increases surface strength). In one embodiment, the use of wet strength additives is minimized. In one embodiment, the use of surface applied strength additives or binders (e.g. starch) is minimized.

In one embodiment, the newly exposed side produced upon peeling the substrate apart is suitable as a work side.

Though not particularly limited, in one embodiment, the paper substrate may have a wall side with a Taber abrasion of 50-200 mg. In another embodiment, the paper substrate may have a work side with a Taber abrasion of 50-200 mg. In another embodiment, the paper substrate may have both work and wall sides with respective Taber abrasions of 50-200 mg. The wall and work sides may have the same or different Taber abrasions. These ranges include all values and subranges therebetween, including 50, 60, 70, 80, 90, 100, 110, 120, 130, 140, 150, 160, 170, 180, 190, and 200 mg. In one embodiment, the work and/or wall sides may include additives to enhance nap generation during sanding. For example, wax may be added to these plies for a fluffier and longer nap after sanding. In another embodiment, the work and/or wall sides may include binder-rich components, which may allow for removing expensive binder from the wallboard joint compound.

Though not particularly limited, in one embodiment, the paper substrate may have a wet tensile strength of 5-60 lb/inch width after soaking in distilled water for 60 sec. at 23° C. This range includes all values and subranges therebetween, including 5, 10, 15, 20, 25, 30, 35, 40, 45, 50, 55, and 60 lb/inch width after soaking in distilled water for 60 seconds at 23° C. Wet tensile strength after soaking may be suitably measured by a modified TAPPI method 456. The measurement is modified as follows: if the tensile strength of the paper substrate is measured before it is completely saturated, the results so obtained are identified as "tensile strength after soaking in water for . . . (time)." Such results are to be distinguished from "wet MD tensile strength" as defined in TAPPI method 456. For purposes herein, the term, soaking, is interpreted as submersing or submersion.

Though not particularly limited, in one embodiment, the paper substrate may have a caliper of 0.005-0.011 inch. This range includes all values and subranges therebetween, including 0.005, 0.006, 0.007, 0.008, 0.009, 0.010, and 0.011 inch. In one embodiment, the caliper may be obtained upon compressing, abrading, heating, or drying the web obtained from an air-laid process, or any combination thereof.

So long as the paper substrate has at least two plies, the number of plies is not particularly limited. In one embodiment, the paper substrate may have 2 to 11 or more plies. This range includes all values and subranges therebetween, including 2, 3, 4, 5, 6, 7, 8, 9, 10, 11, and more plies. In one embodiment, the paper substrate has 3 to 7 plies. In another embodiment, the paper substrate has 3 to 5 plies. In another embodiment, the paper substrate has a maximum of three plies.

Though not particularly limited, in one embodiment, a ply or plies may include one or more of cellulose fibers, pulp fibers, synthetic fibers, recycled fibers, virgin fibers or any combination thereof. In one embodiment, recycled fibers differ from virgin fibers in that they have been previously used in a paper product. In one embodiment, recycled fibers may be recycled cellulose, synthetic, or any combination thereof. In one embodiment, the term, cellulose fibers, includes both cellulose and pulp fibers. The composition of one ply or plies may be the same or different than that of another ply or plies.

Non-limiting examples of synthetic fibers include polyester, polyethylene terephthalate, polybutylene terephthalate, copolyethylene-butylene terephthalate, copolyetheresters, polyolefins, polyethylene, polypropylene, copolyethylene-propylene, nylon, polyacetate; polyvinyl acetate; rayon, polyvinylchloride, copolymers of any of the foregoing, blends of any of the foregoing, combinations of any the foregoing. In one embodiment, the synthetic fiber may be suitably used as a binder or all or part of the adhesive.

In one embodiment, the synthetic fiber includes a so-called bicomponent fiber, for example, one in which a fiber includes two polymers, one having a low melt temperature disposed toward the exterior of the fiber, and one having a higher melt temperature disposed toward the interior of the fiber. In one embodiment, the bicomponent fiber includes a polypropylene or polyethylene terephthalate core and a polyethylene sheath. In one embodiment, the synthetic fiber may be suitably used as a binder or all or part of the adhesive. Non-limiting examples of bi-component or other fibers include those available from FiberVisions Corp. in Duluth, Ga., USA and Trevira GmbH in Bobingen, Germany, for example.

In one embodiment, at least one ply in the multi-ply paper substrate comprises cellulose fibers. In another embodiment, at least one ply in the multi-ply paper substrate comprises cellulose fibers, wherein a majority of the fibers in that ply are cellulose. In one embodiment, the multi-ply paper substrate comprises a combination of cellulose fibers and synthetic fibers.

In one embodiment, the multi-ply paper substrate may contain from 0-100 wt % of cellulose fibers based upon the total weight of the substrate. This range includes all values and subranges therebetween, including 0, 1, 5, 10, 15, 20, 25, 30, 35, 40, 45, 50, 55, 60, 65, 70, 75, 80, 85, 90, 95 99, and 100 wt %. In one embodiment, the multi-ply paper substrate contains from 30 to 99 wt % cellulose fibers.

In one embodiment, one ply or more than one ply in the multi-ply paper substrate may contain from 0-100 wt % of cellulose fibers based upon the total weight of the ply or plies. This range includes all values and subranges therebetween, including 0, 1, 5, 10, 15, 20, 25, 30, 35, 40, 45, 50, 55, 60, 65, 70, 75, 80, 85, 90, 95 99, and 100 wt % based on the weight of the ply.

Though not particularly limited, the cellulose fibers may come from any source. In one embodiment, the cellulose fibers include natural, softwood, hardwood, straw; plant and grass pulp, cotton, other cellulosic fibers, and the like, or a combination thereof.

In one embodiment, the multi-ply paper substrate may contain from 0-100 wt % of synthetic fibers based upon the total weight of the substrate. This range includes all values and subranges therebetween, including 0, 1, 5, 10, 15, 20, 25, 30, 35, 40, 45, 50, 55, 60, 65, 70, 75, 80, 85, 90, 95 99, and 100 wt %.

In one embodiment, one ply or more than one ply in the multi-ply paper substrate may contain from 0-100 wt % of synthetic fibers based upon the total weight of the ply or plies. This range includes all values and subranges therebetween, including 0, 1, 5, 10, 15, 20, 25, 30, 35, 40, 45, 50, 55, 60, 65, 70, 75, 80, 85, 90, 95, 99, and 100 wt % based on the weight of the ply.

Any or all of the plies in the multi-ply paper substrate may include a combination of cellulose and synthetic fibers. For example, in one embodiment, the synthetic fiber may function as the binder, adhesive, or both. In one embodiment, cellulose and synthetic fibers may be present in any weight ratio relative to one another. This range is not particularly limited, and may include for example, weight ratios of cellulose to synthetic fibers of 100:0, 99:1, 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, 5:95, 1:99, and 0:100.

In one embodiment, one or more plies of the multi-ply paper substrate may have 99 wt % bicomponent fibers, but the multi-ply paper substrate has >30 wt % cellulose or pulp fibers.

In one embodiment, one or more plies may include >70 wt % synthetic fibers, and may be suitably produced using spun bond or melt blown technology.

The term, "hardwood" as may be used herein includes fibrous pulp or fibers derived from the woody substance of deciduous trees (angiosperms) such as birch, oak, beech, maple, and eucalyptus, or combination thereof. The term, "softwood" as may be used herein includes fibrous pulps or fibers derived from the woody substance of coniferous trees (gymnosperms) such as varieties of fir, spruce, and pine, as for example loblolly pine, slash pine, Colorado spruce, balsam fir and Douglas fir. In some embodiments, at least a portion of the pulp fibers may be provided from non-woody herbaceous plants including, but not limited to, kenaf, hemp, jute, flax, sisal, or abaca, although legal restrictions and other considerations may make the utilization of hemp and other fiber sources impractical or impossible. Either bleached or unbleached fiber may be utilized. Recycled fibers are also suitable for use.

In one embodiment, the cellulose fibers in a ply or plies may comprise 1 to 100 wt % of cellulose fibers originating from hardwood based upon the total weight of the cellulose fibers in the ply or plies. This range includes all values and subranges therebetween, including 1, 5, 10, 15, 20, 25, 30, 35, 40, 45, 50, 55, 60, 65, 70, 75, 80, 85, 90, 95, 99, and 100 wt % based on the weight of the cellulose fibers in the ply or plies.

In one embodiment, the cellulose fibers in a ply or plies may comprise 1 to 100 wt % of cellulose fibers originating from softwood based upon the total weight of the cellulose fibers in the ply or plies. This range includes all values and subranges therebetween, including 1, 5, 10, 15, 20, 25, 30, 35, 40, 45, 50, 55, 60, 65, 70, 75, 80, 85, 90, 95, 99, and 100 wt % based on the weight of the cellulose fibers in the ply or plies.

In one embodiment, any or all of the plies in the multi-ply paper substrate can have any weight ratio of hardwood to softwood fibers. This range is not particularly limited, and may include for example, weight ratios of hardwood to softwood fibers of 100:0, 99:1, 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, 5:95, 1:99, and 0:100.

In one embodiment, the multi-ply paper substrate may include a delamination ply having an internal bond of 10-180 milli-ft.-lb/sq. in. as measured by TAPPI method 541. This range includes all values and subranges therebetween, including 10, 20, 30, 40, 50, 60, 70, 80, 90, 100, 110, 120, 130, 140, 150, 160, 170, and 180 milli-ft.-lb/sq. in. In one embodiment, the delamination ply is that ply which fails under tension applied normal or approximately normal to the sides of the multi-ply paper substrate, resulting in delamination of the substrate along that ply.

In one embodiment, the delamination ply may have low levels (e.g., less than 50% by weight) of binder, adhesive, or a combination thereof. This range includes all values and subranges therebetween, including less than 50, 45, 40, 35, 30, 25, 20, 15, 10, 9, 8, 7, 6, 5, 4, 3, 2, 1, and 0% by weight of the ply.

The cellulose fibers may be unrefined or refined or fibrillated or a combination thereof.

The length of the cellulose fibers is not particularly limited. In one embodiment, the cellulose fibers have a refined length of 0.5 to 5.0 mm LWAFL as measured by FQA. The terms, LWAFL and FQA are known. Length Weighted Average Fiber Length (LWAFL) is measured by Fiber Quality Analysis (FQA). In one embodiment, this is carried out on an Optec device, as is known. The aforementioned refined length includes all values and subranges therebetween, including 0.5, 0.55, 0.6, 0.65, 0.7, 0.75, 0.8, 0.85, 0.9, 0.95, 1, 2, 3, 4, and 5.0 mm, or any combination thereof. In one embodiment, the refined fibers range from 0.65 to 4.0 mm LWAFL as measured by FQA.

The length of synthetic fibers is not particularly limited. In one embodiment, the synthetic fibers have a length of 0.5 to 5.0 mm LWAFL as measured by FQA. This range includes all values and subranges therebetween, including 0.5, 0.55, 0.6, 0.65, 0.7, 0.75, 0.8, 0.85, 0.9, 0.95, 1, 2, 3, 4, and 5.0 mm, or any combination thereof. In one embodiment, the synthetic fibers range from 0.65 to 4.0 mm LWAFL as measured by FQA.

In one embodiment, the delamination ply may comprise high levels (e.g., 50% or greater by weight of fibers) of hardwood fibers. This range includes all values and subranges therebetween, including 50, 55, 60, 65, 70, 75, 80, 85, 90, 95, 96, 97, 98, 99, and 100% by weight of fibers in the ply and higher.

In one embodiment, the delamination ply may comprise low levels (e.g., less than 50% by weight of fibers) of refined fibers or fibrillated fibers. This range includes all values and subranges therebetween, including less than 50, 45, 40, 35, 30, 25, 20, 15, 10, 9, 8, 7, 6, 5, 4, 3, 2, 1, and 0% by weight of the fibers.

In one embodiment, the delamination ply may comprise any combination of binder, adhesive, fibers, cellulose fibers, hardwood fibers, softwood fibers, refined fibers, fibrillated fibers, or synthetic fibers. In another embodiment, the delamination may occur within an adhesive region, or between an adhesive and an adjoining ply. In this case, the internal bond of the adhesive or the internal bond between an adhesive and an adjoining ply may range from 10 to 180 milli-ft.-lb/sq. in. as measured by TAPPI method 541, and which includes all values and subranges therebetween, including 10, 20, 30, 40, 50, 60, 70, 80, 90, 100, 110, 120, 130, 140, 150, 160, 170, and 180 milli-ft.-lb/sq. in.

In one embodiment, the multi-ply paper substrate may include one or more strength plies which do not delaminate or fail under tension applied normal or approximately normal to the sides of the multi-ply paper substrate—e.g., they delaminate or fail at tensions greater than those at which the delamination ply does. In one embodiment, this is achieved by having a ply or plies with an internal bond or bonds higher than that of the delamination ply. As such, in one embodiment, the ply or plies that do not delaminate may have an internal bond of >10 to 180 milli-ft.-lb/sq. in. as measured by TAPPI method 541. This range includes all values and subranges therebetween, including >10, 20, 30, 40, 50, 60, 70, 80, 90, 100, 110, 120, 130, 140, 150, 160, 170, and 180 milli-ft.-lb/sq. in. In another embodiment, the ply or plies that do not delaminate may have an internal bond or bonds of greater than 180 milli-ft.-lb/sq. in. as measured by TAPPI method 541. This range includes all values and subranges therebetween, for example greater than 180, 181, 183, 185, 187, 189, 190, 200, 210, 220, 250 milli-ft.-lb/sq. in, and higher, as measured by TAPPI method 541.

In one embodiment, the strength ply may comprise any combination of binder, adhesive, fibers, cellulose fibers, hardwood fibers, softwood fibers, refined fibers, fibrillated fibers, or synthetic fibers.

In one embodiment, the strength ply or plies may have high levels (e.g., greater than 50% by weight) of binder, adhesive, or a combination thereof. This range includes all values and subranges therebetween, including greater than 50, 55, 60, 65, 70, 75, 80, 85, 90, 95, 96, 97, 98, 99% by weight of the ply.

In one embodiment, the strength ply or plies may comprise high levels (e.g., 50% or greater by weight of fibers) of softwood fibers. This range includes all values and subranges therebetween, including 50, 55, 60, 65, 70, 75, 80, 85, 90, 95, 96, 97, 98, 99, and 100% by weight of fibers in the ply and higher.

In another embodiment, the strength ply or plies may comprise high levels (e.g., greater than 50% by weight of fibers) of refined fibers or fibrillated fibers. This range includes all values and subranges therebetween, including greater than 50, 55, 60, 65, 70, 75, 80, 85, 90, 95, 96, 97, 98, 99, and 100% by weight of the fibers.

In one embodiment, the cellulose fibers include unrefined southern softwood having lengths ranging from 3.0 to 5.0 mm.

In one embodiment, the cellulose fibers include heavily refined southern softwood having lengths ranging from 2.0 to 4.0 mm.

In one embodiment, the cellulose fibers include unrefined northern softwood having lengths ranging from 3.0 to 4.0 mm.

In one embodiment, the cellulose fibers include heavily refined northern softwood having lengths ranging from 1.0 to 5.0 mm.

In one embodiment, the cellulose fibers include unrefined hardwood having lengths ranging from 0.7 to 1.8 mm.

In one embodiment, the cellulose fibers include refined hardwood having lengths ranging from 0.5 to 1.5 mm.

In one embodiment, the cellulose fibers include refined softwood having lengths ranging from 1.0 to 5.0 mm. In one embodiment, the cellulose fibers include refined hardwood having lengths ranging from 0.5 to 1.8 mm.

In another embodiment, the strength ply or plies may have one or more of an MD tensile, CD tensile, wet tensile upon soaking, or any combination thereof, that is higher than that of the delamination ply.

In one embodiment, at least one ply comprises fibers, of which at least a majority are hardwood fibers.

In one embodiment, at least one ply comprises fibers, of which at least a majority are softwood fibers.

So long as the basis weight of the multi-ply paper substrate is 80-200 gsm, the basis weights of the individual plies and adhesive regions are not particularly limited. For example, in one embodiment, a single ply may have a basis weight of 0.5-180 gsm, which includes all values and subranges therebetween, including 0.5, 1, 2, 3, 4, 5, 6, 7, 8, 9, 10, 15, 20, 25, 30, 35, 40, 45, 50, 75, 85, 95, 100, 120, 140, 160, and 180 gsm.

In one embodiment, the paper substrate may include three plies arranged in the following order:
a ply comprising a basis weight of 5-100 gsm; a ply comprising a basis weight of 5-65 gsm; and a ply comprising a basis weight of 5-100 gsm.

In one embodiment, the paper substrate may include four plies, and the fourth ply may have a basis weight of 30-100 gsm.

In one embodiment, the paper substrate may include a third ply and be arranged in the following order:
a ply comprising a basis weight of 30-100 gsm;
a ply comprising a basis weight of 5-65 gsm; and
a ply comprising a basis weight of 30-100 gsm.

In one embodiment, the paper substrate may include four plies arranged in the following order:
a ply comprising a basis weight of 30-100 gsm;
a ply comprising a basis weight of 5-65 gsm;
a ply comprising a basis weight of 5-50 gsm; and
a ply comprising a basis weight of 30-100 gsm.

In one embodiment, the paper substrate may be arranged in the following order:
a ply comprising a basis weight of 5-100 gsm;
the adhesive in an amount of 0.05-10 gsm; and
a ply comprising a basis weight of 5-100 gsm.

In one embodiment, the paper substrate may include a third ply, the third ply comprising a basis weight of 30-100 gsm.

In one embodiment, the paper substrate may include three plies arranged in the following order:
a ply comprising a basis weight of 30-100 gsm;
the adhesive in an amount of 0.05-10 gsm;
a ply comprising a basis weight of 5-50 gsm; and
a ply comprising a basis weight of 30-100 gsm.

In one embodiment, the paper substrate may include three plies arranged in the following order:
a ply comprising an MD tensile of 20-300 lb/inch width as measured by TAPPI method 494 and/or a CD tensile of 10-300 lb/inch width as measured by TAPPI method 494;
a ply comprising an internal bond of 10 to 180 milli-ft.-lb/sq. in. as measured by TAPPI method 541; and
a ply comprising an MD tensile of 20-300 lb/inch width as measured by TAPPI method 494 and/or a CD tensile of 10-300 lb/inch width as measured by TAPPI method 494.

In one embodiment, the paper substrate may include four plies arranged in the following order:
a ply comprising a Taber abrasion of 50-200 mg;
a ply comprising an MD tensile of 20-300 lb/inch width as measured by TAPPI method 494 and a CD tensile of 10-300 lb/inch width as measured by TAPPI method 494;

a ply comprising an internal bond of 10-180 milli-ft.-lb/sq. in. as measured by TAPPI method 541; and a ply comprising a Taber abrasion of 50-200 mg.

In one embodiment, the paper substrate may include five plies arranged in the following order:

a ply comprising a Taber abrasion of 50-200 mg;

a ply comprising an MD tensile of 10-300 lb/inch width as measured by TAPPI method 494 and/or a CD tensile of 10-300 lb/inch width as measured by TAPPI method 494;

a ply comprising an internal bond of 10-180 milli-ft.-lb/sq. in. as measured by TAPPI method 541;

a ply comprising an MD tensile of 10-300 lb/inch width as measured by TAPPI method 494 and/or a CD tensile of 10-300 lb/inch width as measured by TAPPI method 494; and a ply having a Taber abrasion of 50-200 mg.

In one embodiment, the paper substrate may be arranged in the following order:

a ply comprising an MD tensile of 20-300 lb/inch width as measured by TAPPI method 494 and/or a CD tensile of 10-300 lb/inch width as measured by TAPPI method 494;

the adhesive, which comprises an internal bond of 10 to 180 milli-ft.-lb/sq. in. as measured by TAPPI method 541; and a ply comprising an MD tensile of 20-300 lb/inch width as measured by TAPPI method 494 and/or a CD tensile of 10-300 lb/inch width as measured by TAPPI method 494.

In one embodiment, the paper substrate may include three plies arranged in the following order:

a ply comprising a Taber abrasion of 50-200 mg;

a ply comprising an MD tensile of 20-300 lb/inch width as measured by TAPPI method 494 and a CD tensile of 10-300 lb/inch width as measured by TAPPI method 494;

the adhesive, which comprises an internal bond of 10-180 milli-ft.-lb/sq. in. as measured by TAPPI method 541; and a ply comprising a Taber abrasion of 50-200 mg.

In one embodiment, the paper substrate may include four plies arranged in the following order:

a ply comprising a Taber abrasion of 50-200 mg;

a ply comprising an MD tensile of 20-300 lb/inch width as measured by TAPPI method 494 and/or a CD tensile of 10-300 lb/inch width as measured by TAPPI method 494;

the adhesive, which comprises an internal bond of 10-180 milli-ft.-lb/sq. in. as measured by TAPPI method 541;

a ply comprising an MD tensile of 20-300 lb/inch width as measured by TAPPI method 494 and/or a CD tensile of 10-300 lb/inch width as measured by TAPPI method 494; and a ply having a Taber abrasion of 50-200 mg.

In one embodiment, the paper substrate may include three plies arranged in the following order:

a ply comprising a basis weight of 30-100 gsm;

the adhesive in an amount of 0.05-10 gsm;

a ply comprising a basis weight of 5-50 gsm; and a ply comprising a basis weight of 30-100 gsm.

In one embodiment, the paper substrate may include four plies arranged in the following order:

a ply comprising a basis weight of 30-100 gsm;

a ply comprising a basis weight of 5-50 gsm;

the adhesive in an amount of 0.05-10 gsm;

a ply comprising a basis weight of 5-50 gsm; and a ply comprising a basis weight of 30-100 gsm.

In one embodiment, the paper substrate may include five plies arranged in the following order:

a ply comprising a basis weight of 30-100 gsm;

a ply comprising a basis weight of 5-50 gsm;

a ply comprising a basis weight of 5-65 gsm;

a ply comprising a basis weight of 5-50 gsm; and a ply comprising a basis weight of 30-100 gsm.

In one embodiment, the plies arranged in a particular order may be bound to one another by one or more adhesives, with or without an intervening ply. In one embodiment, the adhesives bonding adjoining plies together may be the same or different. In one embodiment, the adhesive comprises a binder, and the binder permeates all or part of the thickness of the multi-ply paper substrate and binds the plies together.

Though not particularly limited, the paper substrate may have any width. In one embodiment, the paper substrate has a width off a winder of a paper machine of 15-100 inches, which includes all values and subranges therebetween, including 15, 25, 50, 75, and 100 inches.

Though not particularly limited, the paper substrate may be cut to any width. In one embodiment, the paper substrate may be cut to a width of 1.0-3.25 inches, which includes all values and subranges therebetween, including 1.0, 1.5, 1.75, 2, 2.5, 2.75, 3, and 3.25 inches.

Though not particularly limited, the multi-ply paper substrate is particularly suitable for use as a wallboard joint tape. In one embodiment, the multi-ply paper substrate can be cut to a width suitable for use as a wallboard joint tape. The wallboard joint tape may be suitably applied to a joint, corner, opening, hole, depression, screw, nail, defect, or the like on wallboard, sometimes called "drywall" in accordance with well-known methods. In one embodiment, however, wherein the installer wishes to remove a portion of the thus-applied tape, the tape may be easily pulled apart (delaminated) by applying tension normal or approximately normal to the wall or side of the tape. The wallboard joint tape will delaminate either along a ply, an adhesive region, or between an adhesive region and a ply. A portion of the tape remains on the wall, and in one embodiment, a new work surface is presented. The installer can then apply more drywall joint compound to the newly exposed surface, skim it, sand it, apply more tape, paint, or any combination thereof, to effect the repair.

As such, in one embodiment, a method for installing or repairing wallboard includes contacting a wallboard surface with the paper substrate or wallboard joint tape described herein. In another embodiment, the method includes peeling the paper substrate or wallboard joint tape apart, wherein only one ply delaminates. In another embodiment, the method includes peeling the substrate apart, wherein the adhesive delaminates.

The multi-ply paper substrate may be suitably produced by an air-laid process.

In one embodiment, the multi-ply paper substrate comprises one or more sanded or abraded exterior sides, perforations, scoring, slitting, or any combination thereof.

One embodiment of the subject matter claimed herein provides a method for making the multi-ply paper substrate, comprising:

using an air-laid papermaking machine, forming at least two layers, contacting one or both of the layers with an adhesive, and contacting the layers with one another, to form a two-layered web; and compressing the two-layered web, to make the paper substrate.

Air-laid processes are generally known. Non-limiting examples of air-laid processes may be found in U.S. Pat. Nos. 2,624,079, 3,825,381, 3,895,089, 4,141,772, 4,370,289, for example, the entire contents of each of which being hereby incorporated by reference.

In one embodiment, in the air-laid machine, fibers are entrained in one or more air streams and directed onto a moving forming wire, fabric, support, or the like. One or more layers of fibers are thus applied and built up in a layerlike manner on the forming wire or fabric. The type and composition of the fibers and layers may be suitably controlled according to known methods. One or more adhesives may be applied in any suitable manner to one or both sides of a layer, between layers, or the like as the layers are directed onto the forming wire, after a layer is directed to the forming wire, the web, or combination thereof. In one embodiment, the adhesive may be mixed, for example as a powder or other solid, with the fibers as they are entrained in the air stream, or before they are entrained in the air stream, or any combination thereof. In one embodiment, the adhesive may comprise a binder or be in the form of a binder which is applied to the web.

Figure 1:
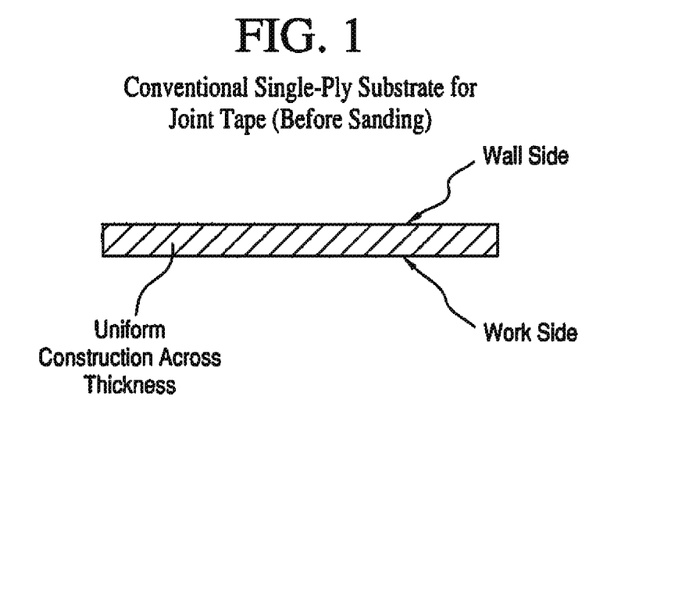
FIG. 1 shows a cross-sectional view of a conventional single-ply substrate for wallboard joint tape.
Figure 2:
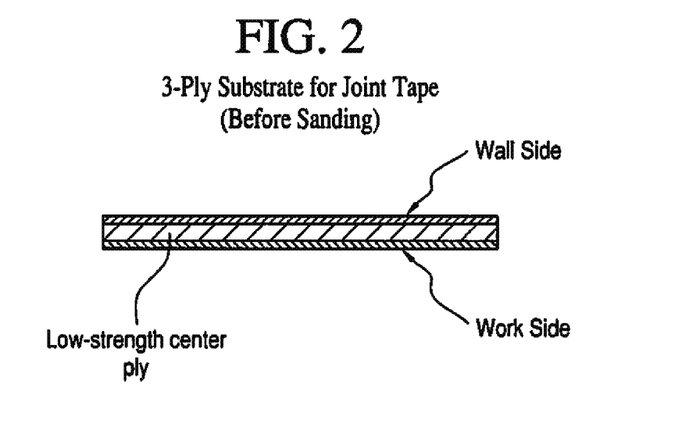
FIG. 2 shows a cross-sectional view of one example of a multi-ply paper substrate.
Figure 3:
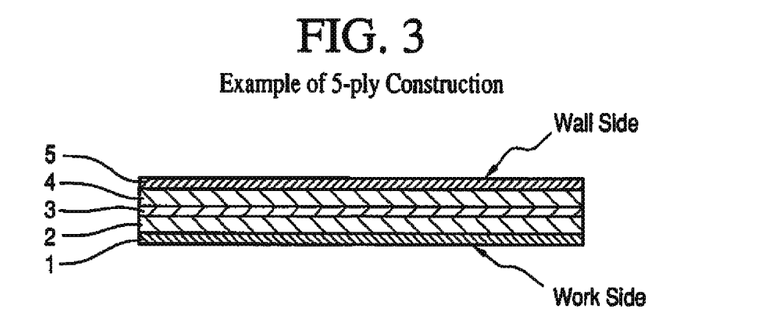
Figure 4:
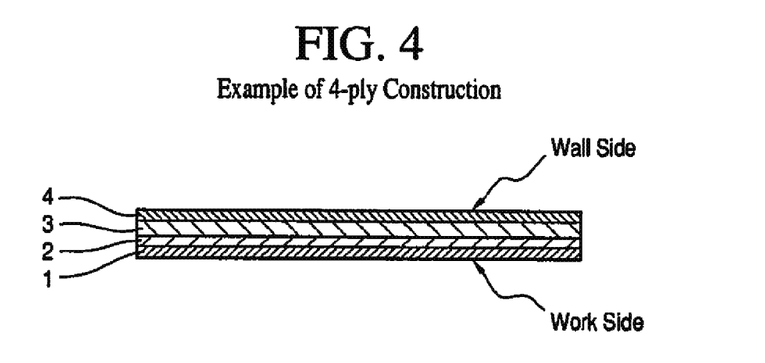
Figure 5:
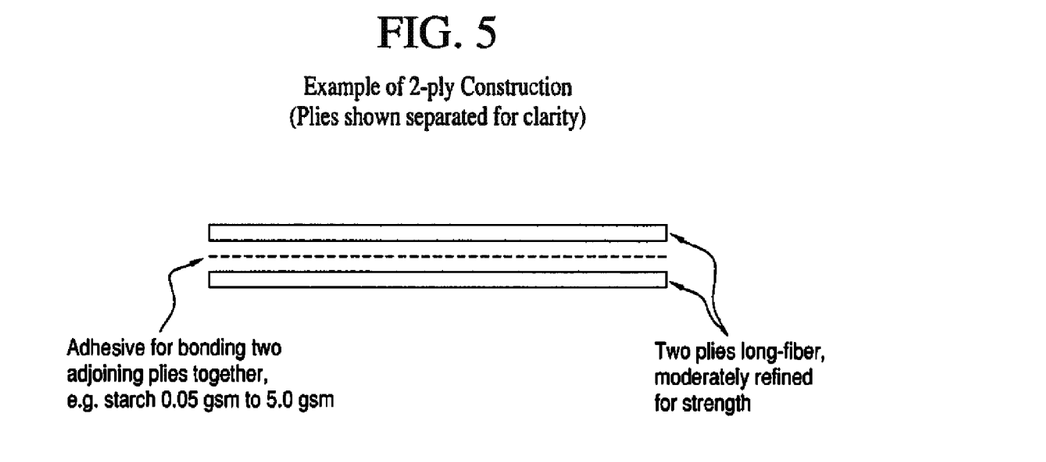
FIG. 5 shows a cross-sectional view of one example of a multi-ply paper substrate in which the adjoining plies are separated for clarity.
Figure 6:
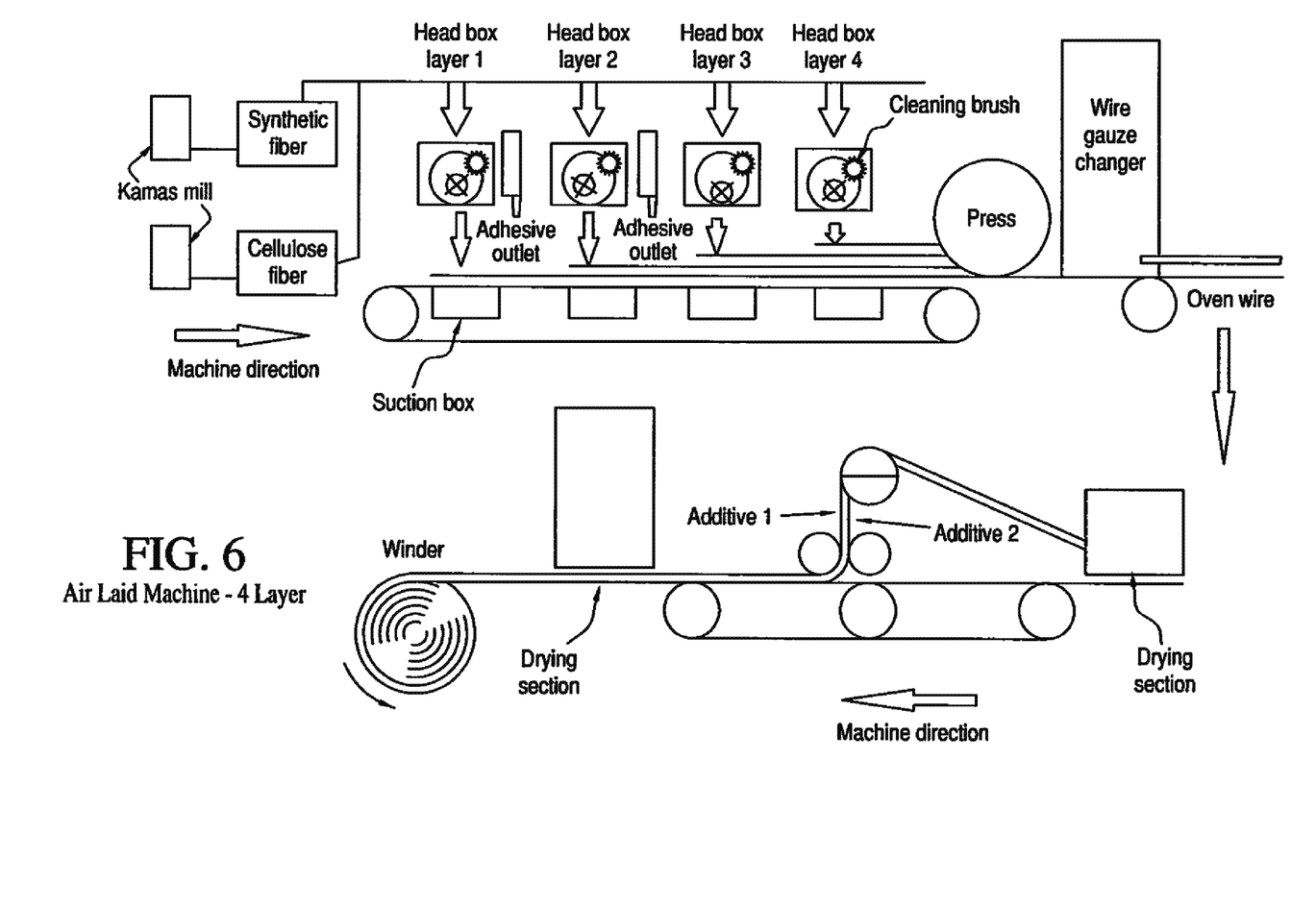
FIG. 6 shows a diagram of one embodiment of an air-laid papermaking machine.

One embodiment of an air-laid papermaking machine is shown in FIG. 6. The fibers obtained in the Kamas mill (hammermill) travel to one or more of the head box layers 1-4 and deposited or air-laid onto the moving wire or fabric approximate to one or more suction boxes. If desired, one or more adhesives may be applied at the adhesive outlets, which may be a spray box, spray boom, powder dropper, or similar. The layers combine to form a web, which is compressed in the press. The compressed web may travel to a drying section, and one or more additives may be optionally added. Further drying may be carried out in the drying section, and the multi-ply paper substrate is collected on a winder. The drying temperature is not particularly limited, and may be suitably selected as appropriate.

Figure 7:
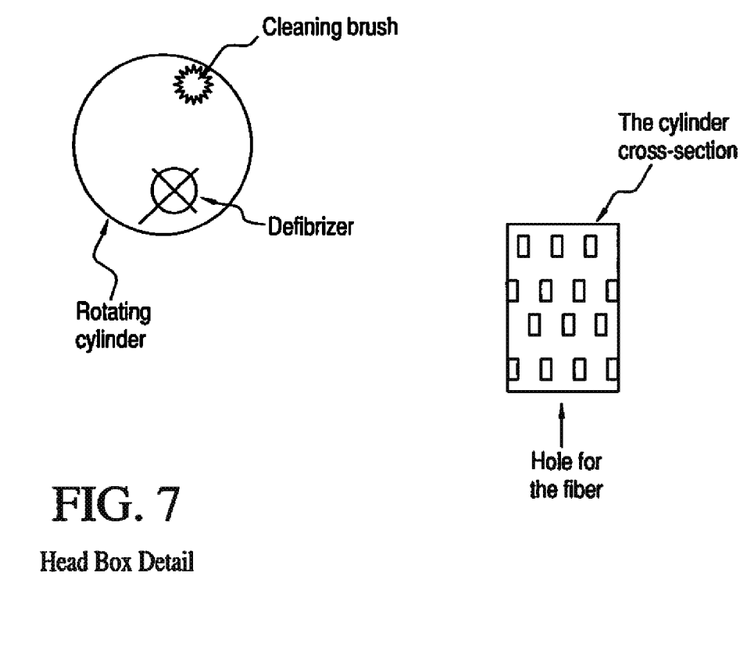
FIG. 7 shows a diagram of one embodiment of an air-laid headbox detail.

One embodiment of an air-laid head box is shown in FIG. 7. The rotating cylinder may include a cleaning brush and a defibrizer. The cleaning brush may clean the holes for the fiber such that the fibers may be deposited from the rotating cylinder onto the moving wire without clogging. The hole size is not particularly limited, and may have any range suitable for the size of fibers desired to be deposited.

In one embodiment, the forming of the at least two layers, and contacting one or both of the layers with an adhesive, can occur in any order. For example, the fibers may be contacted with an adhesive prior to being formed into layers. In another embodiment, the fibers may be contacted with an adhesive at the same time as being formed into layers. In another embodiment, the fibers may be contacted with an adhesive after being formed into layers.

In another embodiment, the fibers may be contacted with an adhesive with any combination of prior to being formed into layers, at the same time as being formed into layers, or after being formed into layers.

The layers may be compressed to form the substrate. Of course, so long as there are at least two layers, the number of layers compressed is not particularly limited. In one embodiment, the number of plies that result in the multi-ply paper substrate will be the same as the number of layers in the web. In this way, at least in part, and optionally combined with the selection and application of adhesive, the properties of each ply and/or the multi-ply paper substrate may be controlled.

The layers, web, substrate, or any combination thereof may be further treated. For example, in one embodiment, one or more of the layers, the web, the substrate, or any combination thereof may be heated, contacted with a binder, or the like, or any combination thereof.

The form of the adhesive is not particularly limited. It may be in the form of solid, powder, liquid, melt, or a combination thereof. Non-limiting examples of adhesive include starch, thermoplastic polymer, thermoplastic elastomeric polymer, blended polymer, bicomponent polymer, solution, dispersion, emulsion, latex, or the like, or any combination thereof. In one embodiment, the adhesive may be a heat sensitive polymer or fiber, which, when heated to a suitable temperature, for example a temperature near or above its melt temperature, it will bond to fibers in a ply or plies. In one embodiment, the adhesive may be a pressure sensitive polymer or fiber, which, when exposed to a suitable pressure will bond to fibers in a ply or plies. Electromagnetically sensitive adhesives, for example, which bond under UV, microwave, infrared, electron beam, or similar electromagnetic radiation, may also be used.

The method may suitably include one or more steps of wetting, spraying, applying water, or the like to any of the layers, web, or substrate.

In one embodiment, the method includes one or more of sanding or abrading one or both of the outer surfaces or sides of the paper substrate, perforating the paper substrate, scoring the paper substrate, slitting the paper substrate, or any combination thereof.

In one embodiment, the method includes contacting a wallboard surface with the paper substrate or wallboard tape.

If desired, the softwood and/or hardwood fibers may be physically and/or chemically modified. Examples of physical modification include, but are not limited to, electromagnetic and mechanical methods. Examples of electrical modification include, but are not limited to, those involving contacting the fibers with an electromagnetic energy source such as light and/or electrical current. Examples of mechanical modification include, but are not limited to, those involving contacting an inanimate object with the fibers. Examples of such inanimate objects include those with sharp and/or dull edges. Such means also involve, for example, refining, cutting, kneading, pounding, impaling, etc means.

Examples of chemical modification include, but are not limited to, those found in the following U.S. Pat. Nos. 6,592,717, 6,582,557, 6,579,415, 6,579,414, 6,506,282, 6,471,824, 6,361,651, 6,146,494, H1,704, U.S. Pat. Nos. 5,698,688, 5,698,074, 5,667,637, 5,662,773, 5,531,728, 5,443,899, 5,360,420, 5,266,250, 5,209,953, 5,160,789, 5,049,235, 4,986,882, 4,496,427, 4,431,481, 4,174,417, 4,166,894, 4,075,136, and 4,022,965, which are hereby incorporated in their entirety by reference.

In one embodiment, all or part of the softwood fibers may optionally originate from softwood species having a Canadian Standard Freeness (CSF) of from 300 to 750. In one embodiment, the fibers originate from a softwood species having a CSF from 400 to 550. These ranges include any and all values and subranges therebetwen, for example, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF. Canadian Standard Freeness is as measured by TAPPI T-227 standard test.

In one embodiment, all or part of the hardwood fibers may optionally originate from hardwood species having a Canadian Standard Freeness of from 300 to 750. In one embodiment, the fibers originate from hardwood species having CSF values of from 400 to 550. These ranges include 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, and 750 CSF, and any and all ranges and subranges therein.

In one embodiment, one or more plies of the multi-ply paper substrate further comprises one or more additive such as binder, sizing, latex, wet-strength agent, dry-strength agent, wax, wax emulsion, microspheres, expandable microspheres, polyvinyl alcohol, polyvinyl acetate, retention aid, filler, antimicotic agent, mold inhibiting agent, thickener, preservative, clay, calcium sulfate dehydrate, calcium sulfate hemihydrates, calcium carbonate, precipitated calcium carbonate, silica, silica colloid, silica sol, water, whitener, colorant, pigment, optical brightening agent, wetting agent, bleaching agent, cationic wet strength agent, alkaline sizing agent, anionic promoter, other additive, or a combination thereof. If present, the amount of additive is not particularly limited. In one embodiment, the additive may be present in amounts ranging from about 0.005 to about 50 weight percent based on the weight of the ply. This range includes all values and subranges therebetween, including about 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, 40, 45, and 50 weight percent, or any combination thereof, based on the weight of the ply.

In one embodiment, the multi-ply paper substrate does not include one or more of a cationic wet strength agent, alkaline sizing agent, or anionic promoter.

Examples of optional fillers include, but are not limited to, clay, calcium carbonate, calcium sulfate hemihydrate, and calcium sulfate dehydrate, chalk, GCC, PCC, and the like.

Examples of optional binders include, but are not limited to, polyvinyl alcohol, Amres (a Kymene type), Bayer Parez, polychloride emulsion, modified starch such as hydroxyethyl starch, starch, polyacrylamide, modified polyacrylamide, polyol, polyol carbonyl adduct, ethanedial/polyol condensate, polyamide, epichlorohydrin, glyoxal, glyoxal urea, ethanedial, aliphatic polyisocyanate, isocyanate, 1,6 hexamethylene diisocyanate, diisocyanate, polyisocyanate, polyester, polyester resin, polyvinyl acetate, polyacrylate, polyacrylate resin, acrylate, and methacrylate. Other optional substances include, but are not limited to silicas such as colloids and/or sols. Examples of silicas include, but are not limited to, sodium silicate and/or borosilicates.

The composition may optionally include one or more pigments. Non-limiting examples of pigments include calcium carbonate, kaolin clay, calcined clay, aluminum trihydrate, titanium dioxide, talc, plastic pigment, ground calcium carbonate, precipitated calcium carbonate, amorphous silica, modified calcium carbonate, modified calcined clay, aluminum silicate, zeolite, aluminum oxide, colloidal silica, colloidal alumina slurry, modified calcium carbonate, modified ground calcium carbonate, modified precipitated calcium carbonate, or a mixture thereof.

As used throughout, ranges are used as a short hand for describing each and every value that is within the range, including all subranges therein.

All other references, as well as their cited references, cited herein are hereby incorporated by reference with respect to relative portions related to the subject matter of the present invention and all of its embodiments.

Numerous modifications and variations on the present invention are possible in light of the above teachings. It is, therefore, to be understood that within the scope of the accompanying claims, the invention may be practiced otherwise than as specifically described herein.

What is claimed is:

1. A multi-ply paper substrate, comprising:
   at least three adjoining plies, at least two of the adjoining plies being bonded to one another by an adhesive therebetween, the adhesive being selected from the group consisting of starch, cooked starch, and adhesive starch;
   a basis weight of 80-200 gsm;
   an internal bond of 10-180 milli-ft.-lb/sq. in. as measured by TAPPI method 541;
   an MD tensile of 20-300 lb/inch width as measured by TAPPI method 494; and
   a CD tensile of 10-300 lb/inch width as measured by TAPPI method 494;
   wherein at least one of said plies has an internal bond higher than that of the other of said plies, the adhesive, or both the adhesive and the other of said plies.

2. The paper substrate of claim 1, further comprising at least one side having a Taber abrasion of 50-200 mg.

3. The paper substrate of claim 1, further comprising a wall side having a Taber abrasion of 50-200 mg.

4. The paper substrate of claim 1, further comprising a work side having a Taber abrasion of 50-200 mg.

5. The paper substrate of claim 1, further comprising a wet tensile strength of 5-60 lb/inch width.

6. The paper substrate of claim 1, further comprising a caliper of 0.005-0.011 inch.

7. The paper substrate of claim 1, which comprises 3 to 11 plies.

8. The paper substrate of claim 1, which comprises 3 to 7 plies.

9. The paper substrate of claim 1, which comprises 3 to 5 plies.

10. The paper substrate of claim 1, which comprises three plies.

11. The paper substrate of claim 1, wherein at least one ply comprises cellulose fibers.

12. The paper substrate of claim 1, wherein at least one ply comprises fibers, of which a majority are cellulose fibers.

13. The paper substrate of claim 1, wherein at least one ply comprises fibers, of which at least a majority are hardwood fibers.

14. The paper substrate of claim 1, wherein at least one ply comprises fibers, of which at least a majority are softwood fibers.

15. The paper substrate of claim 1, wherein a single ply comprises an internal bond of 10-180 milli-ft.-lb/sq. in. as measured by TAPPI method 541.

16. The paper substrate of claim 1, wherein the adhesive comprises an internal bond of 10-180 milli-ft.-lb/sq. in. as measured by TAPPI method 541.

17. The paper substrate of claim 1, wherein the adhesive, a single ply, or both comprise an internal bond of 10-180 milli-ft.-lb/sq. in. as measured by TAPPI method 541.

18. The paper substrate of claim 1, wherein the adhesive comprises an internal bond of greater than 180 milli-ft.-lb/sq. in. as measured by TAPPI method 541.

19. The paper substrate of claim 1, wherein one or more plies comprise an internal bond of greater than 180 milli-ft.-lb/sq. in. as measured by TAPPI method 541.

20. The paper substrate of claim 1, wherein the adhesive, a single ply, or both comprise an internal bond of greater than 180 milli-ft.-lb/sq. in. as measured by TAPPI method 541.

21. The paper substrate of claim 1, wherein one or more plies comprise:
   an MD tensile of 20-300 lb/inch width as measured by TAPPI method 494; and
   a CD tensile of 10-300 lb/inch width as measured by TAPPI method 494.

22. The paper substrate of claim 1, wherein the at least three adjoining plies are arranged in the following order:
   a first ply comprising an MD tensile of 20-300 lb/inch width as measured by TAPPI method 494 and/or a CD tensile of 10-300 lb/inch width as measured by TAPPI method 494;

a second ply comprising an internal bond of 10 to 180 milli-ft.-lb/sq. in. as measured by TAPPI method 541; and a third ply comprising an MD tensile of 20-300 lb/inch width as measured by TAPPI method 494 and/or a CD tensile of 10-300 lb/inch width as measured by TAPPI method 49.

23. The paper substrate of claim 1, wherein the at least three adjoining plies comprise a fourth ply and are arranged in the following order:

a first ply comprising a Taber abrasion of 50-200 mg;

a second ply comprising an MD tensile of 20-300 lb/inch width as measured by TAPPI method 494 and a CD tensile of 10-300 lb/inch width as measured by TAPPI method 494;

a third ply comprising an internal bond of 10-180 milli-ft.-lb/sq. in. as measured by TAPPI method 541; and a fourth ply comprising a Taber abrasion of 50-200 mg.

24. The paper substrate of claim 1, wherein the at least three adjoining plies comprise a fourth ply and a fifth ply which are arranged in the following order:

a first ply comprising a Taber abrasion of 50-200 mg;

a second ply comprising an MD tensile of 10-300 lb/inch width as measured by TAPPI method 494 and/or a CD tensile of 10-300 lb/inch width as measured by TAPPI method 494;

a third ply comprising an internal bond of 10-180 milli-ft.-lb/sq. in. as measured by TAPPI method 541;

a fourth ply comprising an MD tensile of 10-300 lb f/inch width as measured by TAPPI method 494 and/or a CD tensile of 10-300 lbf/inch width as measured by TAPPI method 494; and a fifth ply having a Taber abrasion of 50-200 mg.

25. The paper substrate of claim 1, wherein the at least three adjoining plies are arranged in the following order:

a first ply comprising a basis weight of 5-100 gsm;

a second ply comprising a basis weight of 5-65 gsm; and a third ply comprising a basis weight of 5-100 gsm.

26. The paper substrate of claim 25, further comprising a fourth ply, the fourth ply comprising a basis weight of 30-100 gsm.

27. The paper substrate of claim 1, wherein the at least three adjoining plies are arranged in the following order:

a first ply comprising a basis weight of 30-100 gsm;

a second ply comprising a basis weight of 5-65 gsm; and a third ply comprising a basis weight of 30-100 gsm.

28. The paper substrate of claim 1, wherein the at least three adjoining plies comprise a fourth ply and are arranged in the following order:

a first ply comprising a basis weight of 30-100 gsm;

a second ply comprising a basis weight of 5-65 gsm;

a third ply comprising a basis weight of 5-50 gsm; and a fourth ply comprising a basis weight of 30-100 gsm.

29. The paper substrate of claim 1, wherein the at least three adjoining plies comprise a first ply and a second ply, and wherein the first ply, second ply and the adhesive are arranged in the following order:

a first ply comprising an MD tensile of 20-300 lb f/inch width as measured by TAPPI method 494 and/or a CD tensile of 10-300 lbf/inch width as measured by TAPPI method 494;

the adhesive, which comprises an internal bond of 10 to 180 milli-ft.-lb/sq. in. as measured by TAPPI method 541; and a second ply comprising an MD tensile of 20-300 lb f/inch width as measured by TAPPI method 494 and/or a CD tensile of 10-300 lbf/inch width as measured by TAPPI method 494.

30. The paper substrate of claim 1, wherein the at least three adjoining plies and the adhesive are arranged in the following order:

a first ply comprising a Taber abrasion of 50-200 mg;

a second ply comprising an MD tensile of 20-300 lb f/inch width as measured by TAPPI method 494 and a CD tensile of 10-300 lbf/inch width as measured by TAPPI method 494;

the adhesive, which comprises an internal bond of 10-180 milli-ft.-lb/sq. in. as measured by TAPPI method 541; and a third ply comprising a Taber abrasion of 50-200 mg;

wherein the adhesive bonds together the second ply to the third ply.

31. The paper substrate of claim 1, wherein the at least three adjoining plies comprise a fourth ply and are arranged in the following order:

a first ply comprising a Taber abrasion of 50-200 mg;

a second ply comprising an MD tensile of 20-300 lb f/inch width as measured by TAPPI method 494 and/or a CD tensile of 10-300 lbf/inch width as measured by TAPPI method 494;

the adhesive, which comprises an internal bond of 10-180 milli-ft.-lb/sq. in. as measured by TAPPI method 541;

a third ply comprising an MD tensile of 20-300 lb flinch width as measured by TAPPI method 494 and/or a CD tensile of 10-300 lbf/inch width as measured by TAPPI method 494; and a fourth ply having a Taber abrasion of 50-200 mg;

wherein the adhesive bonds together the second ply to the third ply.

32. The paper substrate of claim 1, wherein the at least three adjoining plies comprise a first ply and a second ply, and wherein the first ply, second ply, and adhesive are arranged in the following order:

a first ply comprising a basis weight of 5-100 gsm;

the adhesive in an amount of 0.05-10 gsm; and a second ply comprising a basis weight of 5-100 gsm;

wherein the adhesive bonds together the first ply to the second ply.

33. The paper substrate of claim 32, wherein the at least three adjoining plies further comprise a third ply, the third ply comprising a basis weight of 30-100 gsm.

34. The paper substrate of claim 1, wherein the at least three adjoining plies and the adhesive are arranged in the following order:

a first ply comprising a basis weight of 30-100 gsm;

the adhesive in an amount of 0.05-10 gsm;

a second ply comprising a basis weight of 5-50 gsm; and a ply comprising a basis weight of 30-100 gsm;

wherein the adhesive bonds together the first ply to the second ply.

35. The paper substrate of claim 1, which comprises a width off a winder of a paper machine of 15-100 inches.

36. The paper substrate of claim 1, which comprises a cut width of 1.5-3.25 inches.

37. The paper substrate of claim 1, wherein the MD tensile is equal to the CD tensile.

38. The paper substrate of claim 1, produced by an air-laid process.

* * * * *